(No Model.)

N. CUNNINGHAM.
VEHICLE BRAKE.

No. 460,564. Patented Oct. 6, 1891.

Witnesses
B. S. Ober
H. T. Riley

Inventor
Newton Cunningham,
By his Attorneys,
C. A. Snow & Co.

UNITED STATES PATENT OFFICE.

NEWTON CUNNINGHAM, OF SUTTON, WEST VIRGINIA.

VEHICLE-BRAKE.

SPECIFICATION forming part of Letters Patent No. 460,564, dated October 6, 1891.

Application filed July 23, 1891. Serial No. 400,502. (No model.)

*To all whom it may concern:*

Be it known that I, NEWTON CUNNINGHAM, a citizen of the United States, residing at Sutton, in the county of Braxton and State of West Virginia, have invented a new and useful Vehicle-Brake, of which the following is a specification.

The invention relates to improvements in vehicle-brakes.

The object of the present invention is to simplify and improve the construction of vehicle-brakes, and to enable the brakes to be applied with great force, and to prevent the accumulation of mud on the brake-shoes, and to keep the brake-bar from falling forward.

The invention consists in the construction and novel combination and arrangement of parts hereinafter fully described, illustrated in the accompanying drawings, and pointed out in the claims hereto appended.

Figure 1:
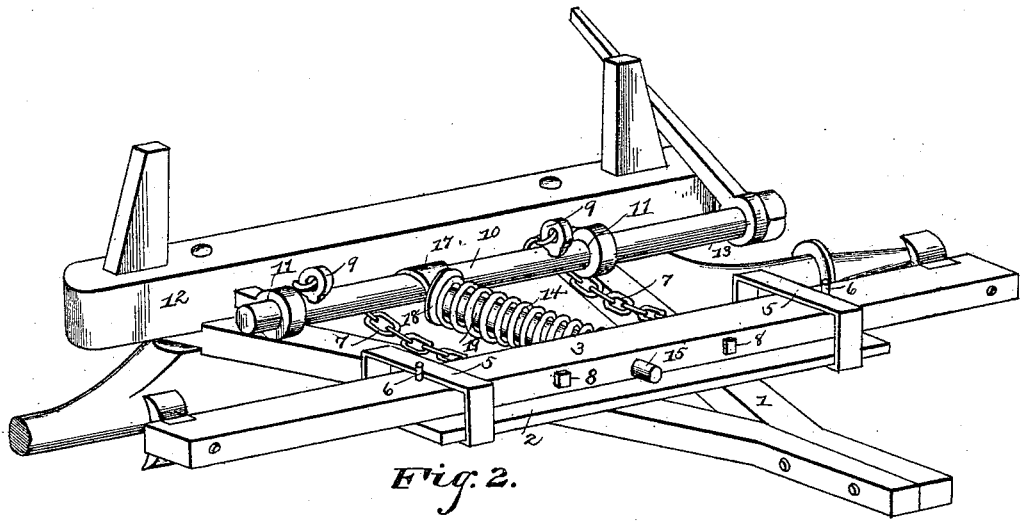
Figure 2:
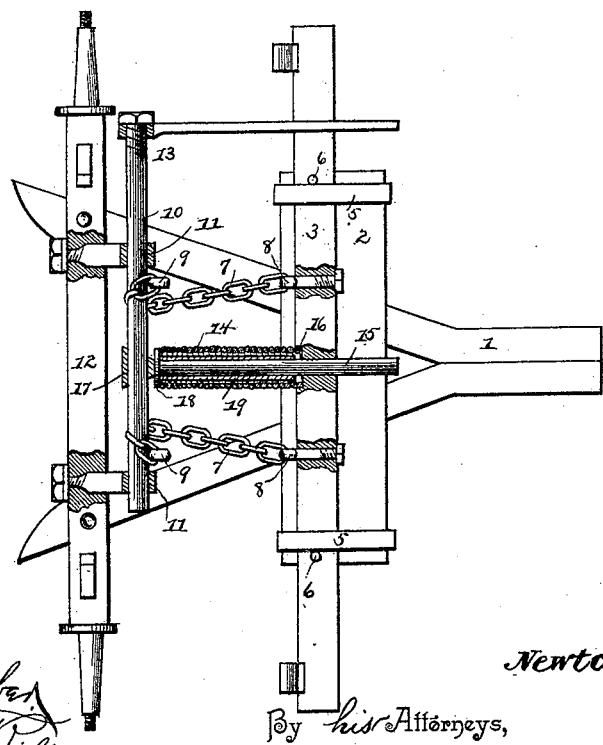

In the drawings, Figure 1 is a perspective view of a portion of a running-gear provided with a brake constructed in accordance with this invention. Fig. 2 is a plan view, partly in section, illustrating the position of the parts when the brake is applied.

Referring to the accompanying drawings, 1 designates the rear hounds of a running-gear having a cross-bar 2, upon which is mounted a laterally-sliding brake-bar 3, provided at its ends with brake-shoes and adapted to move laterally and rearwardly to carry the brake-shoes into engagement with rear wheels and to move forward to throw the brake-shoes off from the wheels. The brake-bar 3 is arranged in oblong keepers 5, and is prevented moving longitudinally therein by stops 6, and it is moved rearwardly to carry its shoes into engagement with the wheels by chains 7, which have their front ends engaging eyebolts 8 of the brake-bar and have their rear end engaging eyes 9 of a shaft 10, and the chains are adapted to be wound around the shaft to apply the brake. The shaft 10 is journaled in bearings 11, arranged on the front face of the bolster 12, and is provided at one end which is designed to extend outward beyond a wagon-body with an arm 13, which in practice is designed to be connected with a brake-lever in the ordinary well-known manner.

The brake is thrown off the wheels by a spiral spring 14, which is interposed between the brake-bar 3 and the shaft 10 and is arranged on a rod 15, and the latter forms a guide for the brake-bar 3 and has its front end arranged in an opening 16 thereof, and is provided at its rear end with a bearing-eye 17 to receive the shaft and with a disk 18, against which the rear end of the spiral spring bears. A sleeve 19, constructed of wood or other suitable material, is arranged within the spiral spring to support the same and surrounds the guide-rod, and it also forms a stop to limit the rearward movement of the brake-bar.

By this construction it will be seen that the brake is adapted to be applied to the wheels and exert great pressure thereon at the expenditure of but little force on the part of the operator, and that the brake is readily thrown off the wheels and is held a sufficient distance therefrom to prevent accumulation of mud on the brake-shoes, and that the brake-bar is held from pitching forward by the chains.

The spiral-spring brake which is illustrated in the accompanying drawings is shown secured to the upper faces of the rear hounds; but it may be as readily arranged beneath the hounds and will be found equally as effective.

What I claim is—

1. In a brake, the combination, with a running-gear provided with a cross-bar, of a brake-bar sliding thereon and provided with a horizontal opening and carrying at its ends brake-shoes, a shaft journaled in suitable bearings and arranged in front of the rear bolster and provided at one end with an arm designed to be connected to the brake-lever, chains connecting the brake-bar with the shaft and adapted to be wound around the latter, and a guide-rod having a front end arranged in the front of the brake-bar and provided at its rear end with a bearing-eye to receive the shaft, substantially as described.

2. In a brake, the combination, with a running-gear provided with a cross-bar, of a brake-bar sliding thereon and provided with a central horizontal opening and carrying brake-shoes at its ends, a shaft journaled in suitable bearings at the front of the rear bolster, chains connecting the brake-bar with the shaft and adapted to be wound around the latter, a guide-rod having its front end arranged in the opening of the brake-bar and provided at its rear end with a bearing-eye to receive the shaft, and a spiral spring arranged on the guide-rod and interposed between the brake-bar and the shaft and adapted to throw the brake off the wheels, substantially as described.

3. In a brake, the combination, with a running-gear provided with a cross-bar, of a brake-bar sliding thereon and provided with a central horizontal opening and carrying brake-shoes at its ends, the keepers arranged at the ends of the cross-bar and receiving the brake-bar, stops arranged on the brake-bar and adapted to engage the keepers and prevent longitudinal movement of the brake-bar, a shaft journaled in suitable bearings at the front of the rear bolster, chains connecting the brake-bar with the shaft and adapted to be wound around the latter, a guide-rod having its front arranged in the opening of the brake-bar and provided at its rear end with an eye to receive the shaft, a spiral spring arranged on the guide-rod and interposed between the brake-bar and the shaft, and the sleeve arranged within the spiral spring and surrounding the rod, substantially as described.

In testimony that I claim the foregoing as my own I have hereto affixed my signature in presence of two witnesses.

NEWTON CUNNINGHAM.

Witnesses:
 L. H. KELLY,
 JOHN BYRNE.